(12) United States Patent
Anderson et al.

(10) Patent No.: US 11,379,329 B2
(45) Date of Patent: *Jul. 5, 2022

(54) VALIDATION OF DATA WRITTEN VIA TWO DIFFERENT BUS INTERFACES TO A DUAL SERVER BASED STORAGE CONTROLLER

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/744,083

(22) Filed: Jan. 15, 2020

(65) Prior Publication Data

US 2020/0151071 A1    May 14, 2020

Related U.S. Application Data

(63) Continuation of application No. 15/695,887, filed on Sep. 5, 2017, now Pat. No. 10,572,359.

(51) Int. Cl.
G06F 11/00 (2006.01)
G06F 11/22 (2006.01)
(Continued)

(52) U.S. Cl.
CPC ........ G06F 11/221 (2013.01); G06F 11/1625 (2013.01); G06F 11/1666 (2013.01);
(Continued)

(58) Field of Classification Search
CPC ............... G06F 11/221; G06F 11/1666; G06F 11/2035; G06F 11/2097; G06F 2212/1008
See application file for complete search history.

(56) References Cited

U.S. PATENT DOCUMENTS 6,009,524 A * 12/1999 Olarig ................... G06F 21/445
709/225
7,051,174 B2 * 5/2006 Ash ...................... G06F 11/1666
707/999.202

(Continued)

OTHER PUBLICATIONS

List of IBM Patents or Patent Applications Treated as Related, dated Jan. 15, 2020, 2 pp. [18.740C1 (Appendix P)].

(Continued)

*Primary Examiner* — Amine Riad
(74) *Attorney, Agent, or Firm* — Konrad Raynes Davda & Victor LLP; Rabindranath Dutta

(57) ABSTRACT

A first server of a storage controller is configured to communicate with a host via a first bus interface, and a second server of the storage controller is configured to communicate with the host via a second bus interface. Data is written from the host via the first bus interface to a cache of the first server and via the second bus interface to a non-volatile storage of the second server. The data stored in the cache of the first server is periodically compared to the data stored in the non-volatile storage of the second server.

15 Claims, 10 Drawing Sheets

(51) Int. Cl.
  *G06F 11/16* (2006.01)
  *G06F 12/0875* (2016.01)
  *G06F 11/20* (2006.01)

(52) U.S. Cl.
  CPC ...... *G06F 11/2035* (2013.01); *G06F 11/2043* (2013.01); *G06F 12/0875* (2013.01); *G06F 11/2097* (2013.01); *G06F 2212/1008* (2013.01)

(56) References Cited

U.S. PATENT DOCUMENTS

| | | | | |
|---|---|---|---|---|
| 7,171,610 | B2* | 1/2007 | Ash | G06F 11/0727 714/718 |
| 7,908,512 | B2* | 3/2011 | Deenadhayalan | G11B 20/182 714/6.13 |
| 7,962,737 | B2* | 6/2011 | Lo | G06F 9/4416 713/2 |
| 8,224,786 | B2* | 7/2012 | Atluri | G06F 16/2308 707/660 |
| 8,732,551 | B2* | 5/2014 | Chirca | G06F 12/0897 714/764 |
| 8,966,184 | B2* | 2/2015 | Atkisson | G06F 3/0655 711/133 |
| 8,996,951 | B2* | 3/2015 | Hyde | G06F 11/0793 714/763 |
| 9,076,530 | B2* | 7/2015 | Gomez | G11C 13/0064 |
| 9,268,635 | B2* | 2/2016 | Sharon | G06F 11/1016 |
| 9,405,669 | B2* | 8/2016 | Ash | G06F 11/004 |
| 9,817,610 | B1 | 11/2017 | Shallal et al. | |
| 2003/0028746 | A1* | 2/2003 | Durrant | G06F 12/1027 711/206 |
| 2005/0228930 | A1* | 10/2005 | Ning | G06F 13/4031 710/306 |
| 2006/0034131 | A1 | 2/2006 | Ono et al. | |
| 2006/0106982 | A1* | 5/2006 | Ashmore | G06F 11/2089 711/114 |
| 2008/0082856 | A1 | 4/2008 | French et al. | |
| 2008/0222347 | A1 | 9/2008 | Chamberlain et al. | |
| 2009/0228744 | A1 | 9/2009 | Deenadhayalan et al. | |
| 2012/0140541 | A1 | 6/2012 | Viau et al. | |
| 2014/0089567 | A1 | 3/2014 | Pignatelli | |
| 2015/0046747 | A1 | 2/2015 | Gaertner et al. | |
| 2017/0109283 | A1 | 4/2017 | Ash et al. | |
| 2017/0123913 | A1 | 5/2017 | Taranta et al. | |
| 2017/0309348 | A1 | 10/2017 | Bhushan Singh et al. | |
| 2018/0107417 | A1 | 4/2018 | Shechter et al. | |
| 2019/0073284 | A1 | 3/2019 | Anderson et al. | |
| 2020/0110671 | A1* | 4/2020 | Woo | G06F 11/1456 |
| 2021/0089453 | A1* | 3/2021 | Hayakawa | G06F 11/1641 |

OTHER PUBLICATIONS

Office Action 1 for U.S. Appl. No. 15/695,887, dated May 16, 2019, 13 pp. [18.740 (OA1)].

Response to Office Action 1 for U.S. Appl. No. 15/695,887, dated Aug. 16, 2019, 10 pp. [18.740 (ROA1)].

Notice of Allowance 1 for U.S. Appl. No. 15/695,887, dated Oct. 10, 2019, 6 pp. [18.740 (NOA1)].

* cited by examiner

VALIDATION OF DATA WRITTEN VIA TWO DIFFERENT BUS INTERFACES TO A DUAL SERVER BASED STORAGE CONTROLLER

CROSS-REFERENCE TO RELATED APPLICATION

This application is a continuation of U.S. patent application Ser. No. 15/695,887, filed Sep. 5, 2017, which application is incorporated herein by reference in its entirety.

BACKGROUND

1. Field

Embodiments relate to the validation of data written via two different bus interfaces to a dual server based storage controller.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one or the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

The dual server based storage controller attempts to maintain two copies of the data while the data is moving through the storage controller. The servers have two areas of their primary memory that are used for holding host computing system data: cache and non-volatile storage (NVS). NVS contains write data until the data is destaged from the cache to the storage devices. When a write is sent to a volume from a host and both the servers are operational, the write data is placed into the cache of the owning server and into the NVS of the other server. The NVS copy of the write data may be accessed if a write failure occurs and the cache is empty or possibly invalid in the owning server. Otherwise, the NVS copy of the write data is discarded after the destage from cache to the storage devices is complete.

The NVS in one server may backup write data from the cache in the other server so that if one server fails, the write data in the cache of the failed server is stored in the NVS of the operational server. After one server fails, all I/O requests are directed toward the operational server. When both servers are available, each server may be assigned to handle I/O requests for specific logical storage devices configured within the physical storage devices. In the event of a failure of one of the servers, a failover will occur to have the operational server handle all I/O requests previously handled by the failed server so that access to the storage devices managed by the storage controller remains available. As part of the failover process, the operational server remains online and all the cached data for the failed server (i.e., the write data to the logical devices assigned to the failed server that was backed up in the NVS of the operational server) is copied (also known as restored) from the NVS in the operational server to the cache of the operational server.

SUMMARY OF THE PREFERRED EMBODIMENTS

Provided are a method, system, and computer program product in which a first server of a storage controller is configured to communicate with a host via a first bus interface, and a second server of the storage controller is configured to communicate with the host via a second bus interface. Data is written from the host via the first bus interface to a cache of the first server and via the second bus interface to a non-volatile storage of the second server. The data stored in the cache of the first server is periodically compared to the data stored in the non-volatile storage of the second server.

In additional embodiments, in response to the data stored in the cache of the first server not matching the data stored in the non-volatile storage of the second server during the comparing, the operation of the second server is disabled, and commands from the host continue to be serviced via the first server.

In yet additional embodiments, the comparing of the data is performed after a predetermined plurality of destages from the cache of the first server or after passage of a predetermined amount of time.

In certain embodiments, comparing the data stored in the cache of the first server to the data stored in the non-volatile storage of the second server comprises: copying an image of the cache of the first server to a first buffer; restoring data from the non-volatile storage of the second server to generate an image of the non-volatile storage of the second server; copying the image of the non-volatile storage of the second server into a second buffer; and determining whether data in records of the first buffer matches with data in records of the second buffer, and whether record headers except for adapter identifiers of the records of the first buffer matches with record headers except for adapter identifiers of the records of the second buffer.

In further embodiments, in response to determining that either data in records of the first buffer does not match with data in records of the second buffer, or record headers except for adapter identifiers of the records of the first buffer does not match with record headers except for adapter identifiers of the records of the second buffer, a determination is made that data stored in the cache of the first server does not match the data stored in the non-volatile storage of the second server.

In yet further embodiments, in response to the data stored in the cache of the first server matching the data stored in the non-volatile storage of the second server during the comparing, both the first server and the second server continue to operate.

In certain embodiments, the first server and the second server are also coupled via a network interface to the host, wherein a syncio process is used to perform writes from the first bus interface and the second bus interface, and wherein the syncio process allows the host to hold an application thread in a spin loop waiting for a write operation to complete, and wherein a likelihood of an error in writing identical data to the cache of the first server and the non-volatile storage of the second server is greater when the identical data is attempted to be written from the host to the first server and the second server over the first bus interface and the second bus interface, than over the network interface.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in Syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt.

In certain embodiments, for performing a write operation, a host splits the write operation into a cache operation on a first server and an NVS operation on a second server. Both operations have to complete successfully or the entire write operation is failed by the code that executes in the host. There may be situations in which erroneous data is written in the NVS and/or the cache and the erroneously written data may not be detected by the host while performing the write operation. In case of a failover, the erroneously written data on the NVS is restored into cache, and the storage controller may have data loss or may lose data integrity. Certain embodiments provide a mechanism to detect the occurrence of such situations, and provide mechanisms to perform a recovery action.

Certain embodiments provide a mechanism for detecting erroneously written data in NVS or cache, by verifying the data written by syncio and by preventing data errors from propagating. The verification of the data is performed by storing the cache image in a first buffer and the restored NVS in a second buffer, and comparing the data in the first buffer and the second buffer to check if the data matches.

Exemplary Embodiments

Figure 1:
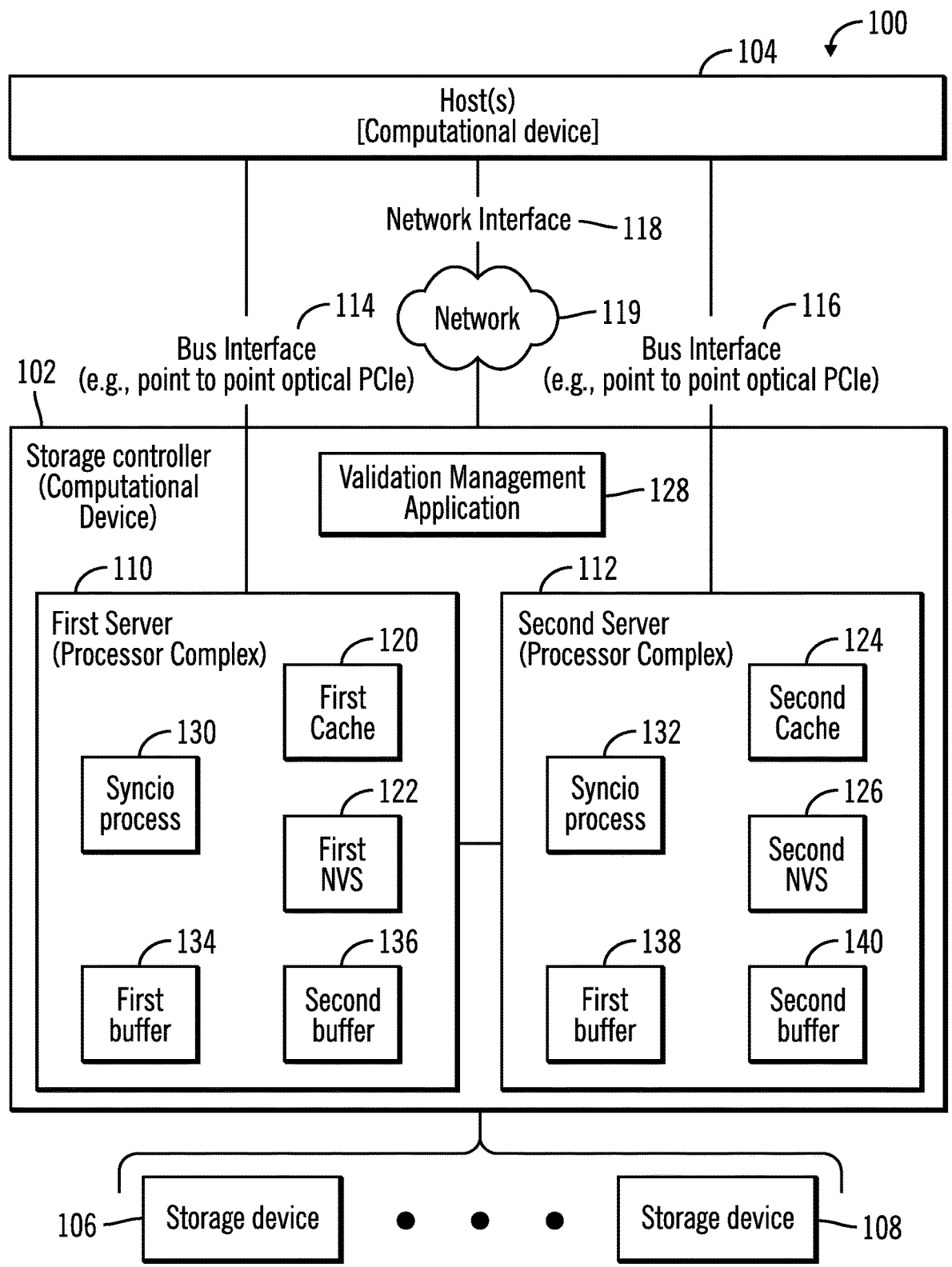
FIG. 1 illustrates a block diagram of a computing environment comprising a dual server based storage controller coupled to one or more hosts and one or more storage devices, where syncio based writes occur from the host to the storage controller, in accordance with certain embodiments.

FIG. 1 illustrates a block diagram of a computing environment 100 comprising a dual server based storage controller 102 coupled to one or more hosts 104 and one or more storage devices 106, 108, where syncio based writes occur from the one or more hosts 104 to the storage controller 102, in accordance with certain embodiments. The storage controller 102 may be comprised of a first server 110 and a second server 112.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache of the storage controller 102.

The storage controller 102, the servers 110, 112 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 110, 112 may provide redundancy because if one server undergoes a failure from which recovery is not possible, an alternate server may perform the functions of the server that failed. Each of the plurality of servers 110, 112 may be referred to as a processing complex and may include one or more processors and/or processor cores.

The storage controller 102, the servers 110, 112 and the one or more hosts 104 may be elements in any suitable network, such as, a storage area network, a wide area network, the Internet, an intranet. In certain embodiments, storage controller 102, the servers 110, 112 and the one or more hosts 104 may be elements in a cloud computing environment.

In certain embodiments, a host 104 may be coupled to the storage controller 102 via a bus interface [e.g., a point to point optical Peripheral Component Interconnect Express (PCIe) interface] 114, 116 and a network interface 118. Syncio operations from the host 104 may be performed over the bus interfaces 114, 116. Traditional I/O operations from the host 104 may be performed over the network interface 118. The bus interfaces 114, 116 may comprise a faster access channel for I/O than the network interface 118. Additional bus interface technology to extend the bus interface 114, 116 may be utilized, including PCIe extender cables or components, such as a distributed PCIe switch, to allow PCIe over Ethernet, such as with the ExpEther technology. The network interface 118 may couple the host 104 via a network adapter to a network 119 that includes the storage controller 102.

The first server 110 of the storage controller 102 includes memory comprising a first cache 120 and a first NVS 122, and the second server 112 of the storage controller 102 includes memory comprising a second cache 124 and a second NVS 126.

The cache 120, 124 may in certain embodiments may comprise a write cache partitioned into one or more ranks, where each rank may include one or more storage tracks. The cache 120, 124 may be any suitable cache known in the art or developed in the future. In some embodiments, the cache 120, 124 may be implemented with a volatile memory and/or non-volatile memory. The cache 120, 124 may store both modified and unmodified data, where the cache 120, 124 may periodically destage (i.e., move) data from the cache 120, 124 to storage devices 106, 108 controlled by the servers 110, 112.

The NVS 122, 126 may also be referred to as a "persistent" cache and is implemented with non-volatile memory that may or may not utilize external power to retain data stored therein. In some embodiments, a backup power source, such as a battery, supplies the NVS 122, 126 with power to retain the data stored therein in case of power loss. The NVS 122, 126 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. Access to the data is from the copy retained in the cache.

In certain embodiments, a validation management application 128 that executes in the storage controller 102 provides a mechanism for validating tracks between the first cache 120 and the second NVS 126, or between the second cache 124 and the first NVS 122. The validation management application 128 may execute in any or all of the servers 110, 112 or may be an application that executes when virtualization is performed to access the hardware elements of the storage controller 102. In certain embodiments, the validation management application 128 may be implemented in software, firmware, hardware or any combination thereof.

It should be noted that the storage controller 102 may be configured and accessed in many different ways. For example, virtualization may be performed to access the hardware elements of the storage controller 102. Additionally, in certain embodiments, the storage controller 102 may have more than two servers.

Each of the two servers 110, 112 include a syncio process 130, 132 that allow the performing of syncio based writes from the hosts 104 to the two servers 110, 112. Each of the two servers 110, 112 also include at least two buffers (shown via reference numerals 134, 136, 138, 140). In certain embodiments, the validation management application 128 uses the buffers 134, 136, 138, 140 to compare the contents of the cache of one server to the contents of the NVS of the other server.

Figure 2:
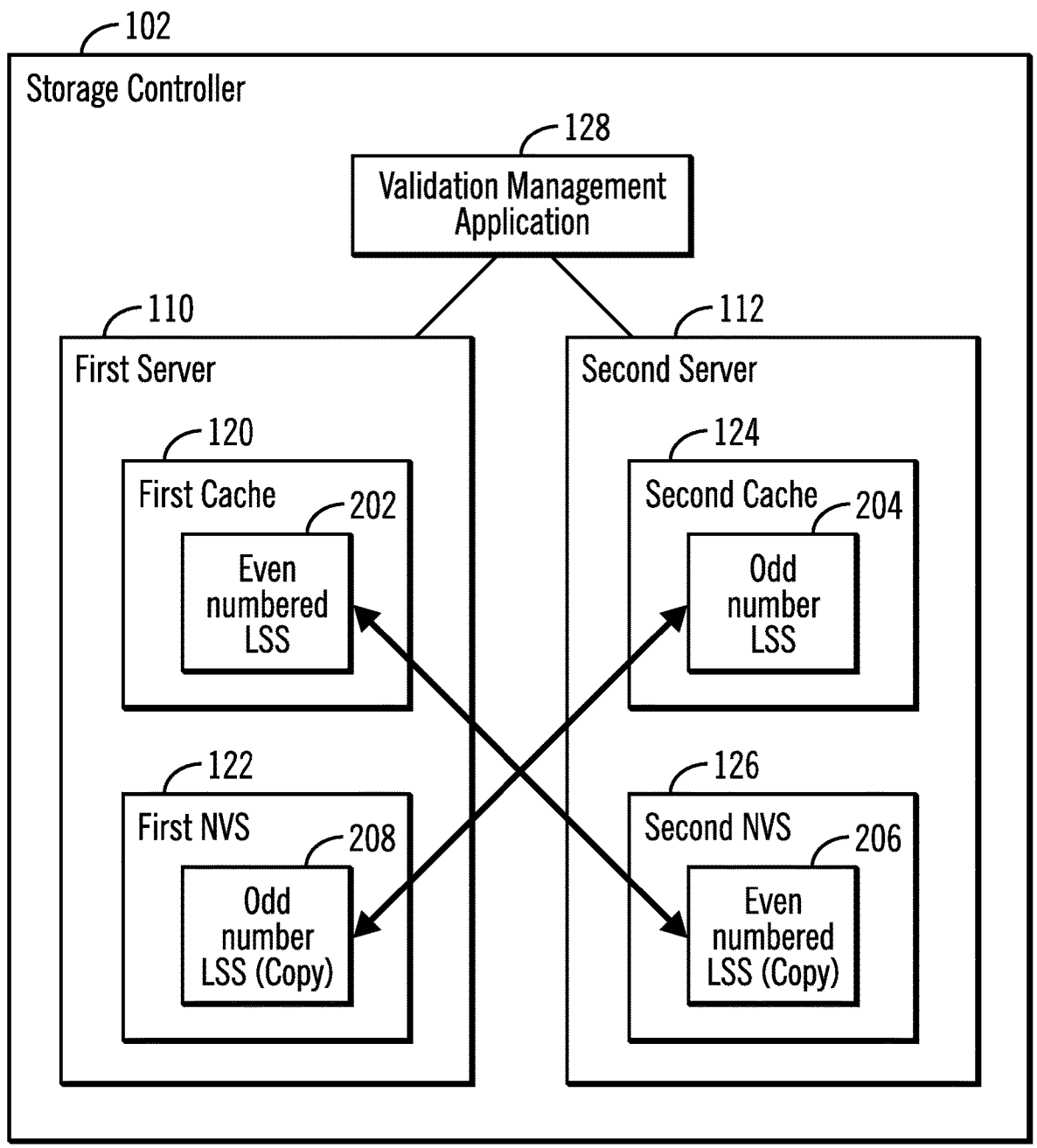
FIG. 2 illustrates a block diagram of the dual server based storage controller with a first cache and a first NVS controlled by a first server, and a second cache and a second NVS controlled by a second server, in accordance with certain embodiments.

FIG. 2 illustrates a block diagram of the dual server based storage controller 102 with a first cache 120 and a first NVS 122 controlled by a first server 110, and a second cache 124 and a second NVS 126 controlled by a second server 112, in accordance with certain embodiments.

The first cache 120 is used for all logical volumes that are members of even numbered logical storage systems (LSS) 202. It may be noted than an LSS is a logical construct that groups logical volumes and logical units (LUN) in groups, where in certain embodiments the LSSs may be numbered via integers starting from 0 to and ending at 255 if there are 256 LSSs. Likewise, the second cache 124 is used for all logical volumes that are members of odd numbered LSSs 204. For every write that is placed into the first cache 120 of the first server 110, a copy 206 is placed into the second NVS 126 that is in the second server 112. For every write that is placed into the second cache 124 of the second server 112, a copy 208 is placed into the first NVS 122 that is in the first server 110. As a result, in case of failure of the first server 110, the second server 112 may be used for recovery of data, and in case of failure of the second sever 112, the first server 110 may be used for the recovery of data.

In certain embodiments shown in FIG. 2, the validation management application 128 periodically determines whether the first cache 120 is in synchronization with the second NVS 126, and the second cache 124 in synchronization with the first NVS 122, where in certain embodiments the validation management application 128 may comprise one or more applications or may be part of another application. The validation management application 128 may execute in one or both of the servers 110, 112 and/or the storage controller 102.

In FIG. 2, for every write that is placed into the first cache 120 of the first server 110, a copy is placed into the second NVS 126 that is in the second server 112. Thus, the following flow of data is for a write from a host 104 when both the first server 110 and the second server 112 are operational:

(1) Data is written by the host 104 via syncio via the first bus interface 114 to first cache 120 in the first server 110. At the same time, the same data is written via syncio to second NVS 126 of the second server 112;

(2) The write operations complete and a period of time elapses;

(3) The write data is destaged from the first cache 120 of the first server 110 to a storage device 106, 108; and (4) The write data is discarded from the NVS 126 of the second server 112.

However, if there is an execution error or failure of the first server 110 prior to the completion of the destage of the write data from the NVS 126, that necessitates a failover to the second server 112, then if there is a mismatch in the data written via syncio in step (1) to the first cache 120 and the second NVS 126, then data in the second NVS 126 data may be erroneous and should not be used.

Figure 3:
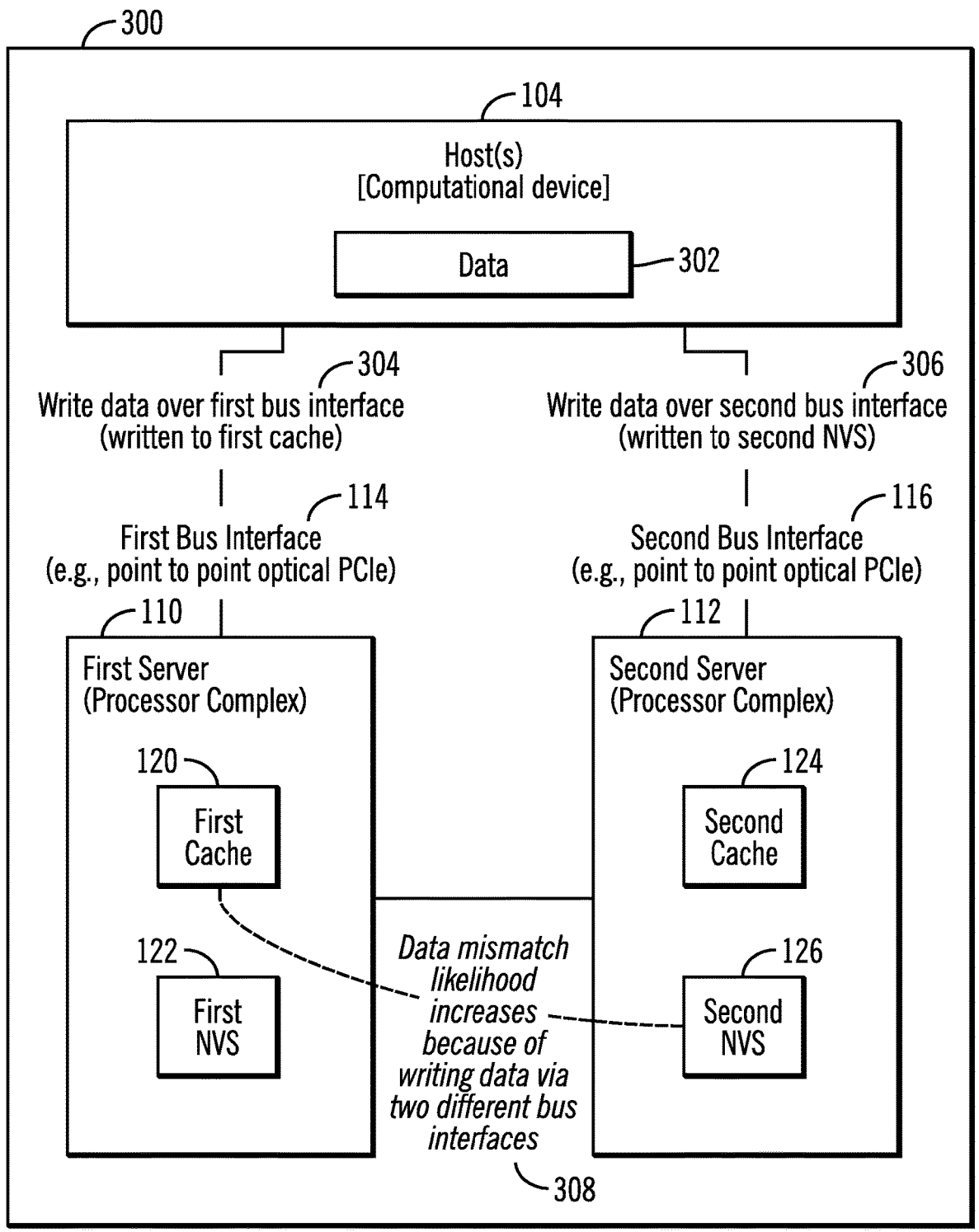
FIG. 3 illustrates a block diagram that shows how the likelihood of data mismatch between a cache of the first server and a NVS of the second server increases because of different bus interfaces writing to the first server and the second server in syncio based writes, in accordance with certain embodiments.

FIG. 3 illustrates a block diagram 300 that shows how the likelihood of data mismatch between a cache 120 of the first server 110 and a NVS 126 of the second server 112 increases because of different bus interfaces 114, 116 writing to the first server and the second server in syncio based writes, in accordance with certain embodiments.

In FIG. 3, the host 104 attempts to write the same data 302 to both the first cache 120 of the first server 110 and the second NVS of the second server 112. The write to the first cache (shown via reference numeral 304) takes place over the first bus interface 114 that couples the host 104 to the first server 110, and the write to the second NVS 126 (shown via reference numeral 306) takes place over the second bus interface 116 that couples the host 104 to the second server. Since two different bus interfaces 114, 116 are used to write the same data 302 to different servers 110, 112, the likelihood of data mismatch between the data written to the different servers 110, 112 may increase over embodiments where the host 104 uses the single network interface 118 to communicate with the network 119 to write the same data 302 to the different servers 110, 112 (shown via reference numeral 308). As a result, periodic validation to determine that identical data has actually been written to the first server 110 and the second server 112 is performed.

Figure 4:
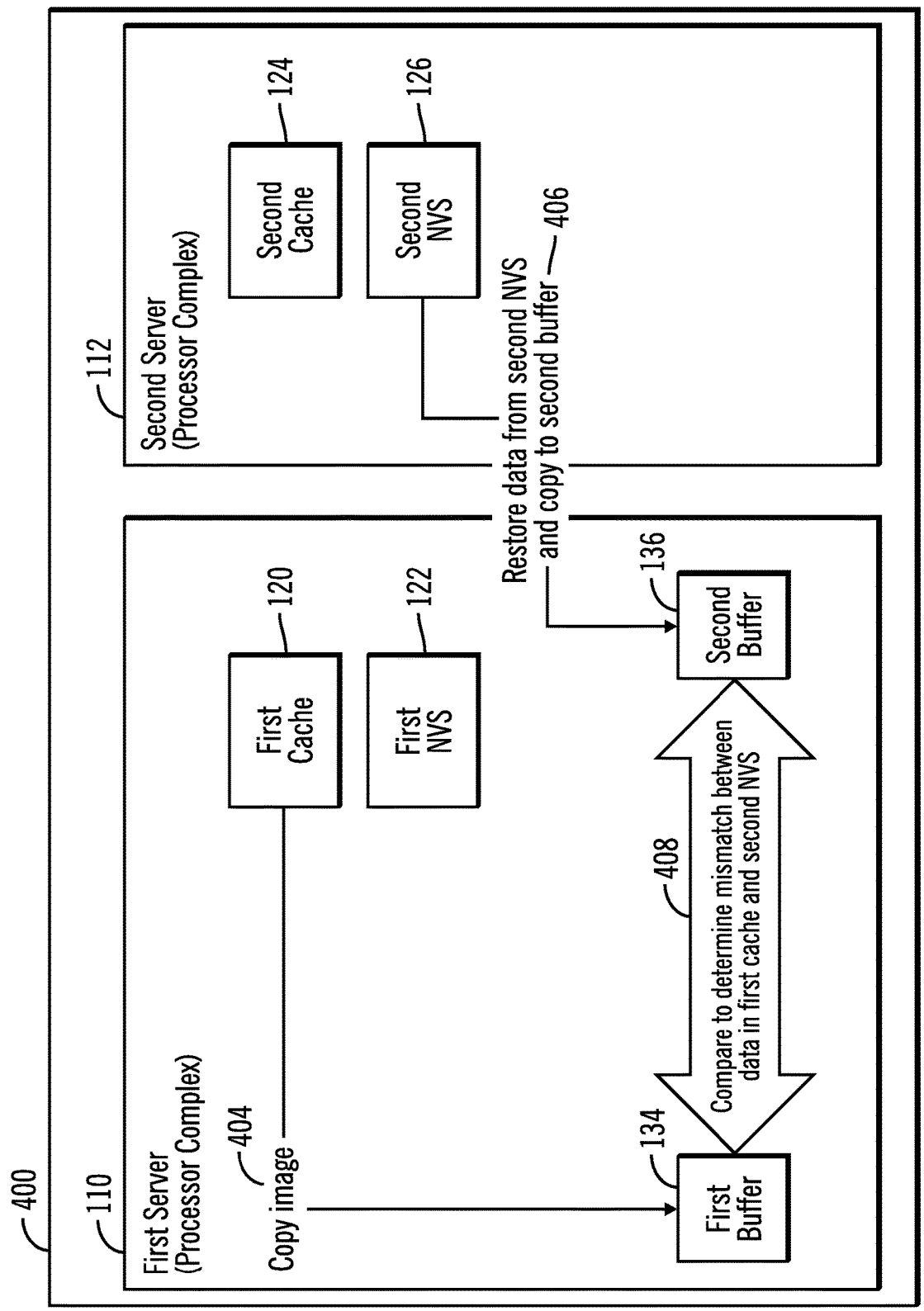
FIG. 4 illustrates a block diagram that shows how validation is performed for data stored in the first cache of the first server and data stored in the second NVS of the second server, in accordance with certain embodiments.

FIG. 4 illustrates a block diagram 400 that shows how validation is performed for data stored in the first cache 120 of the first server 110 and data stored in the second NVS 126 of the second server 112, in accordance with certain embodiments. Similar embodiments may be used for validation of data stored in the second cache 124 of the second server 112 and data stored in the first NVS 122 of the first server 110.

An image of the first cache 120 referred to as the cache image is copied (shown via reference numeral 404) to the first buffer 134 of the first server 110. Data is restored from the second NVS 126 and copied to the second buffer 136 (shown via reference numeral 406). The restoration of the data from the second NVS 126 refers to the extraction of the data necessary for substituting the data stored in the first cache 120. The records of the first buffer 134 and the records of the second buffer 136 are compared to determine mismatch between data written to the first cache 120 and the second NVS 126 (shown via reference numeral 408).

Figure 5:
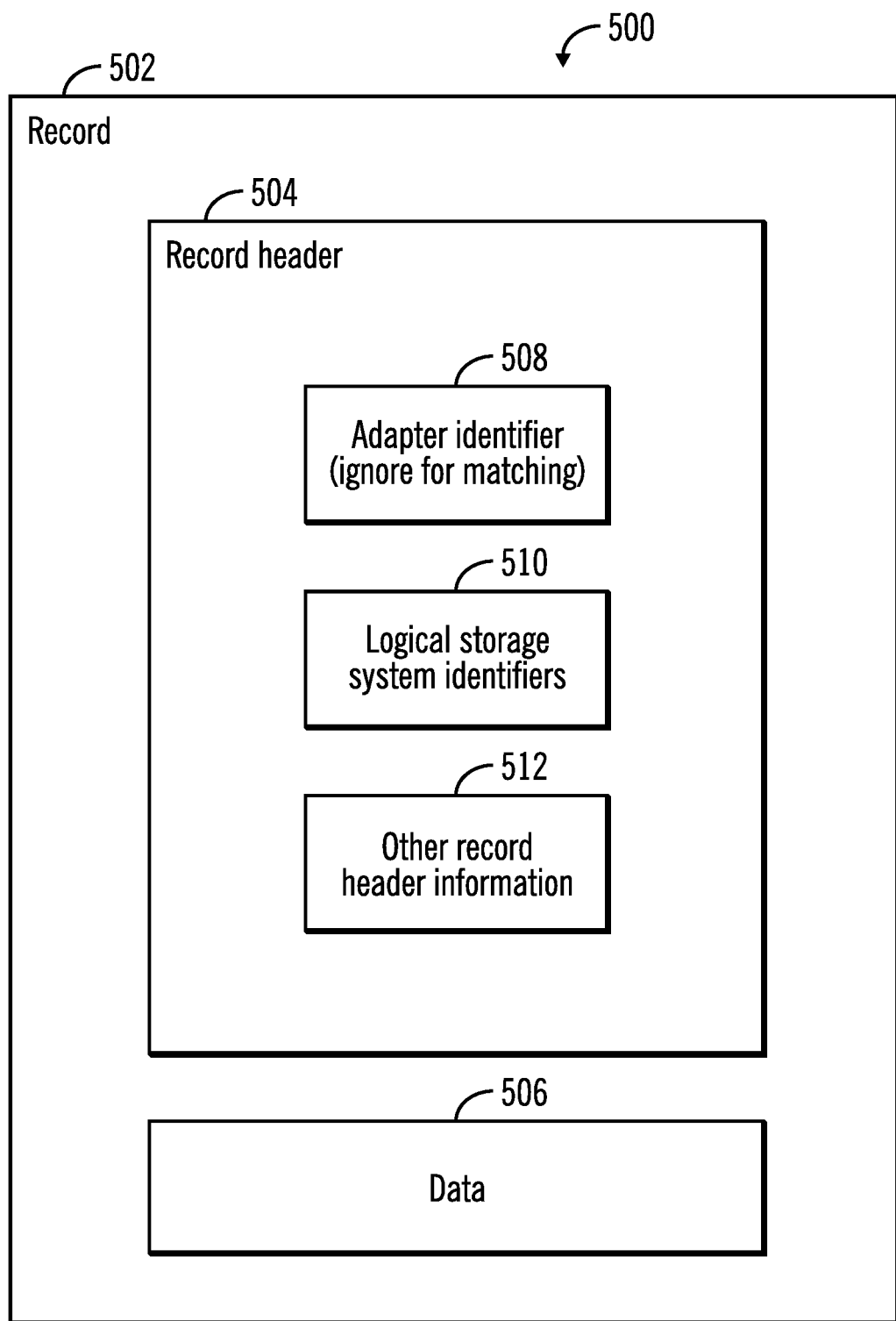
FIG. 5 illustrates a block diagram that shows an exemplary record stored in a first buffer that stores a copy of cache data from a first server and a second buffer that stores a copy of NVS data from a second server, in accordance with certain embodiments.

FIG. 5 illustrates a block diagram 500 that shows an exemplary record 502 stored in a first buffer 134 that stores a copy of cache data from a first server 110, and a second buffer 136 that stores a copy of NVS data from a second server 112, in accordance with certain embodiments.

Each record may include a record header 504 and the data written 506 from the host 104. The record header may include an adapter identifier 508 that identifies an adapter via which data was written, and logical storage system identifiers 510 associated with the data in the record 502. Other record header information 512 may also be stored in the record header 504. While comparing the records of the first buffer 134 and the records of the second buffer 136 to determine mismatch between data written to the first cache 120 and the second NVS 126 (shown via reference numeral 408 in FIG. 4), the adapter identifiers 508 are ignored and not compared because they may differ even if the same data has been written on the first cache 120 and the second NVS 126.

Figure 6:
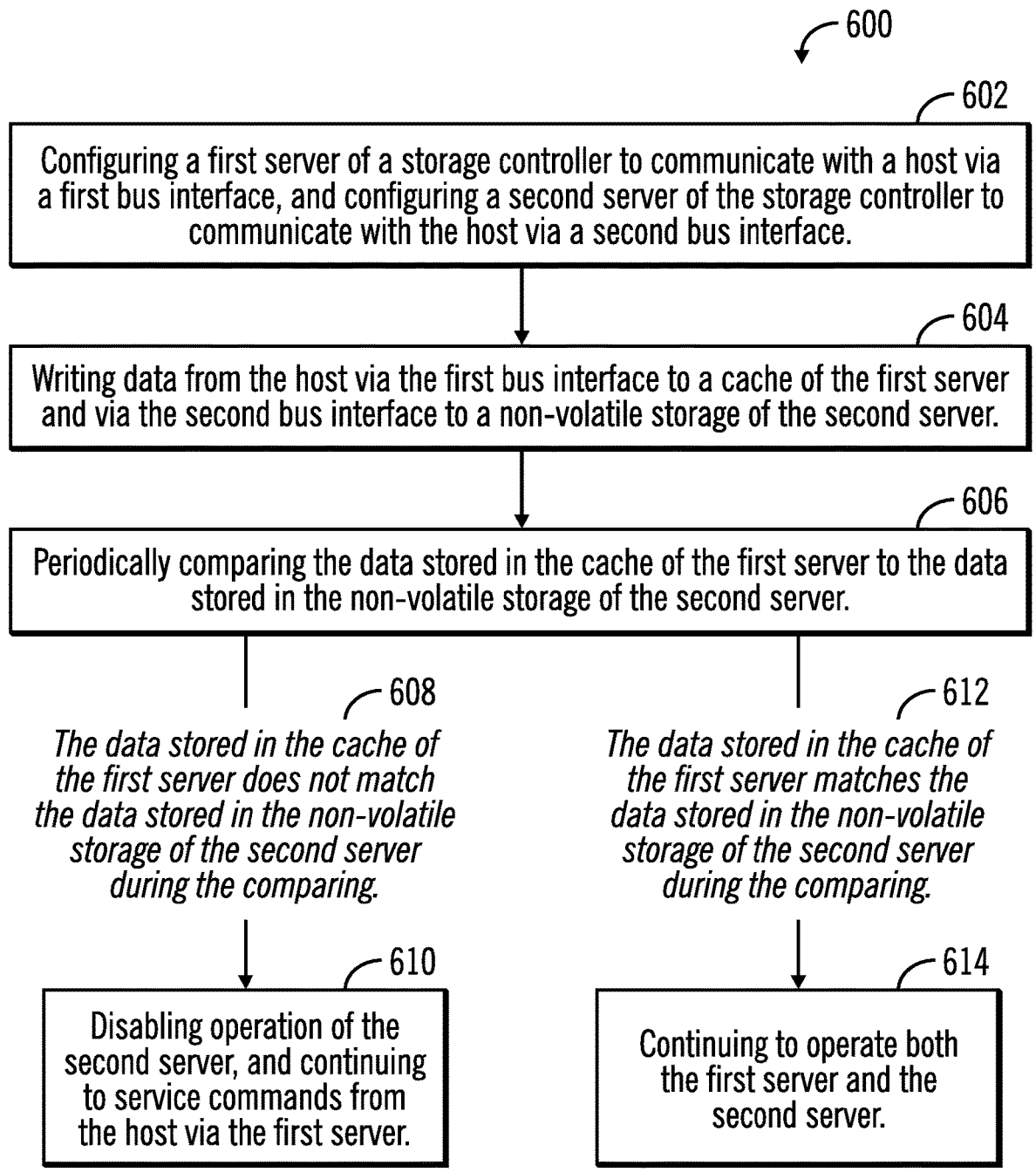
FIG. 6 illustrates a first flowchart that shows how data validation is performed between the cache of one server and the NVS of another server in syncio, in accordance with certain embodiments.

FIG. 6 illustrates a first flowchart 600 that shows how data validation is performed between the cache of one server and the NVS of another server in syncio, in accordance with certain embodiments. The operations shown in FIG. 6 may be performed by the validation management application 128 and other application that execute in the storage controller 102.

Control starts at block 602 in which a first server 110 of a storage controller 102 is configured to communicate with a host 104 via a first bus interface 114, and a second server 112 of the storage controller 102 is configured to communicate with the host 104 via a second bus interface 116. Data is written (at block 604) from the host 104 via the first bus interface 114 to a cache 120 of the first server 110 and via the second bus interface 116 to a non-volatile storage 126 of the second server 112. The data stored in the cache 120 of the first server 110 is periodically compared (at block 606) to the data stored in the non-volatile storage 126 of the second server 112. The comparing of the data is performed after a predetermined plurality of destages (e.g., every 10000 destage operations) from the cache 120 of the first server 110 or after passage of a predetermined amount of time (e.g., every 3 seconds).

If on comparing the data stored in the cache 120 of the first server 110 to the data stored in the non-volatile storage 126 of the second server 112 (at block 606), it is determined that the data stored in the cache 120 of the first server 110 does not match the data stored in the non-volatile storage 126 of the second server 112 (at block 608) then control proceeds to block 610 in which the operation of the second server is disabled, and commands from the host continue to be serviced via the first server.

If on comparing the data stored in the cache 120 of the first server 110 to the data stored in the non-volatile storage 126 of the second server 112 (at block 606), it is determined that the data stored in the cache 120 of the first server 110 does match the data stored in the non-volatile storage 126 of the second server 112 (at block 612) then control proceeds to block 614 in which both the first server 110 and the second server 112 continue to operate.

Figure 7:
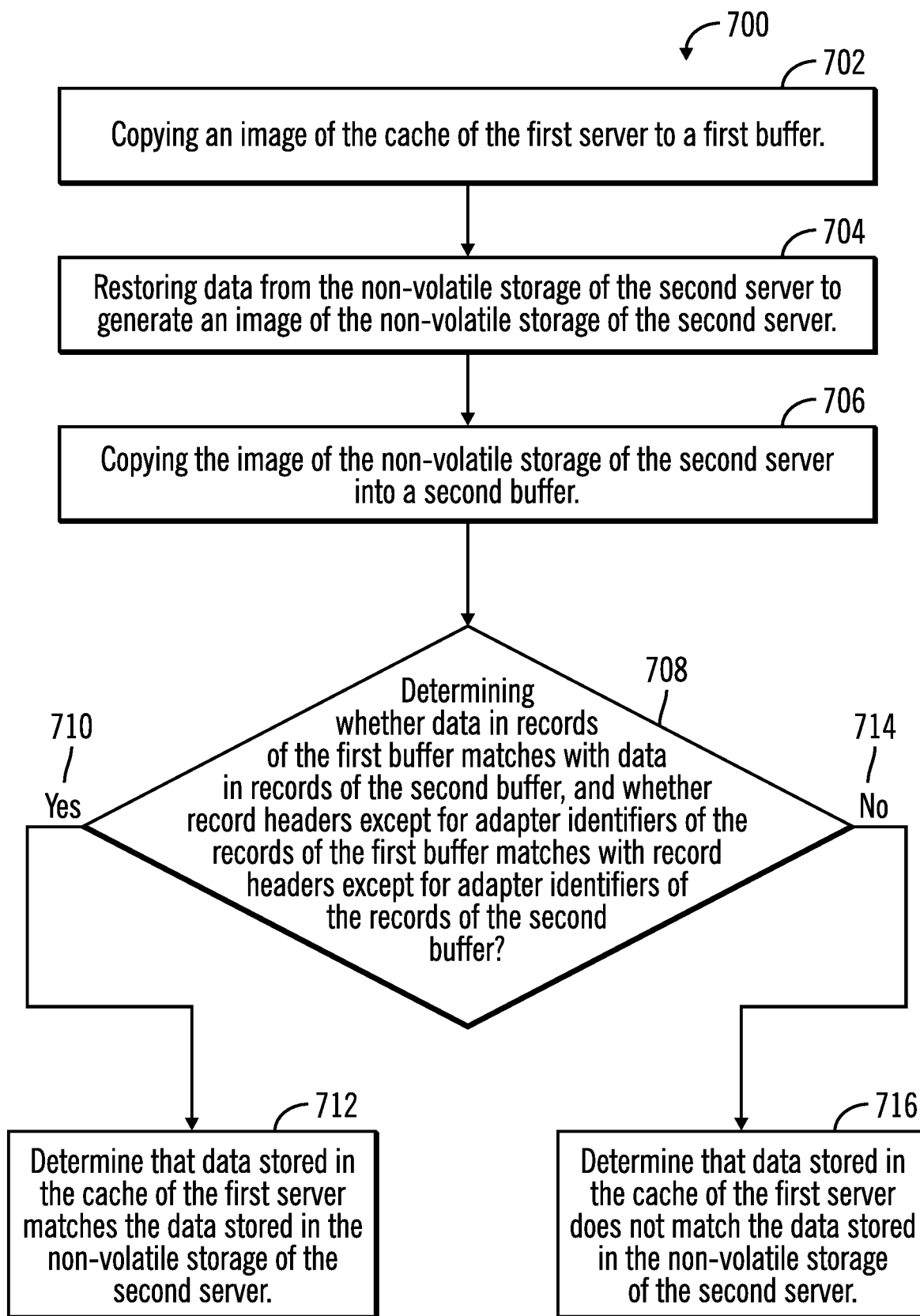
FIG. 7 illustrates a second flowchart that shows how data validation is performed between the cache of one server and the NVS of another server in syncio, in accordance with certain embodiments.

FIG. 7 illustrates a second flowchart 700 that shows how data validation is performed between the cache of one server and the NVS of another server in syncio, in accordance with certain embodiments. The operations shown in FIG. 7 may be performed by the validation management application 128 and other application that execute in the storage controller 102.

Control starts at block 702 in which the validation management application 128 copies an image of the cache 120 of the first server 110 to a first buffer 134. Control proceeds to block 704 in which data from the non-volatile storage 126 of the second server 112 is restored to generate an image of the non-volatile storage 126 of the second server 112. The validation management application 128 copies (at block 706) the image of the non-volatile storage 126 of the second server 112 into a second buffer 136.

From block 706, control proceeds to block 708 in which the validation management application 128 determines whether data in records of the first buffer 134 matches with data in records of the second buffer 136, and whether record headers except for adapter identifiers of the records of the first buffer 134 matches with record headers except for adapter identifiers of the records of the second buffer 136

(exemplary records 502, record headers 504, adapter identifiers 508, and data 506 in exemplary records have been shown in FIG. 5).

In response to determining that data in records of the first buffer 134 matches with data in records of the second buffer 136, and record headers except for adapter identifiers of the records of the first buffer 134 matches with record headers except for adapter identifiers of the records of the second buffer 134 ("Yes" branch 710), the validation management application 128 determines (at block 712) that data stored in the cache 120 of the first server 110 matches the data stored in the non-volatile storage 126 of the second server 112.

In response to determining that data in records of the first buffer 134 does not match with data in records of the second buffer 136, or that record headers except for adapter identifiers of the records of the first buffer 134 does not match with record headers except for adapter identifiers of the records of the second buffer 136 ("No" branch 714), the validation management application 128 determines (at block 716) that data stored in the cache 120 of the first server 110 does not match the data stored in the non-volatile storage 126 of the second server 112.

In certain embodiments, a syncio process 130, 132 is used to perform writes from the first bus interface 114 and the second bus interface 116, and the syncio process 130, 132 allows the host 104 to hold an application thread in a spin loop waiting for a write operation to complete, wherein a likelihood of an error in writing identical data to the cache 120 of the first server 110 and the non-volatile storage 126 of the second server 112 is greater when the identical data is attempted to be written from the host 104 to the first server 110 and the second server 112 over the first bus interface 114 and the second bus interface 116, than over the network interface 118.

Therefore, FIGS. 1-7 illustrate certain embodiments for validating data written to a first server 110 and a second server 112 when syncio is used to perform writes from a host to the first server 110 and the second server 112.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
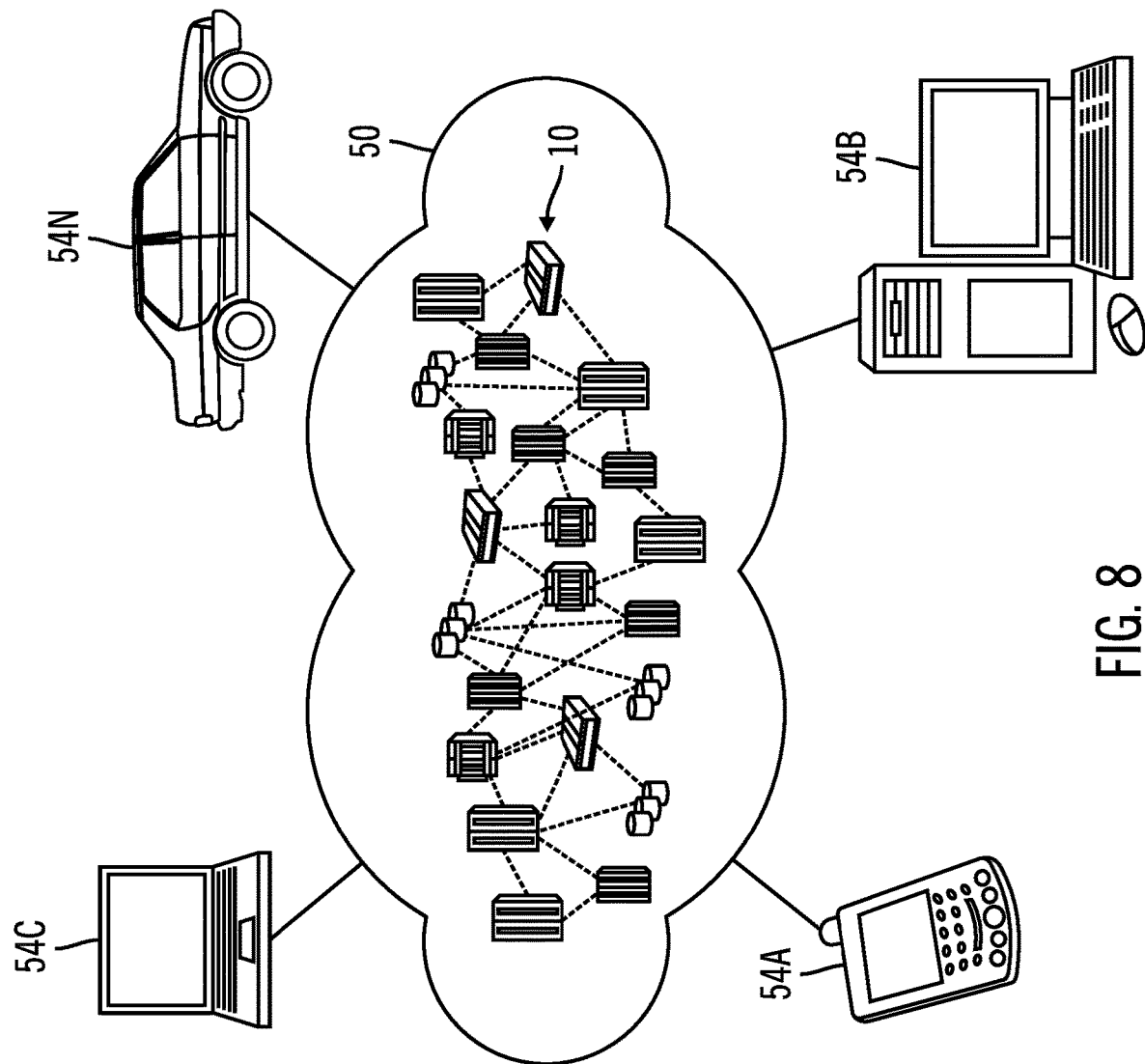
FIG. 8 illustrates a block diagram of a cloud computing environment, in accordance with certain embodiments.

Referring now to FIG. 8 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
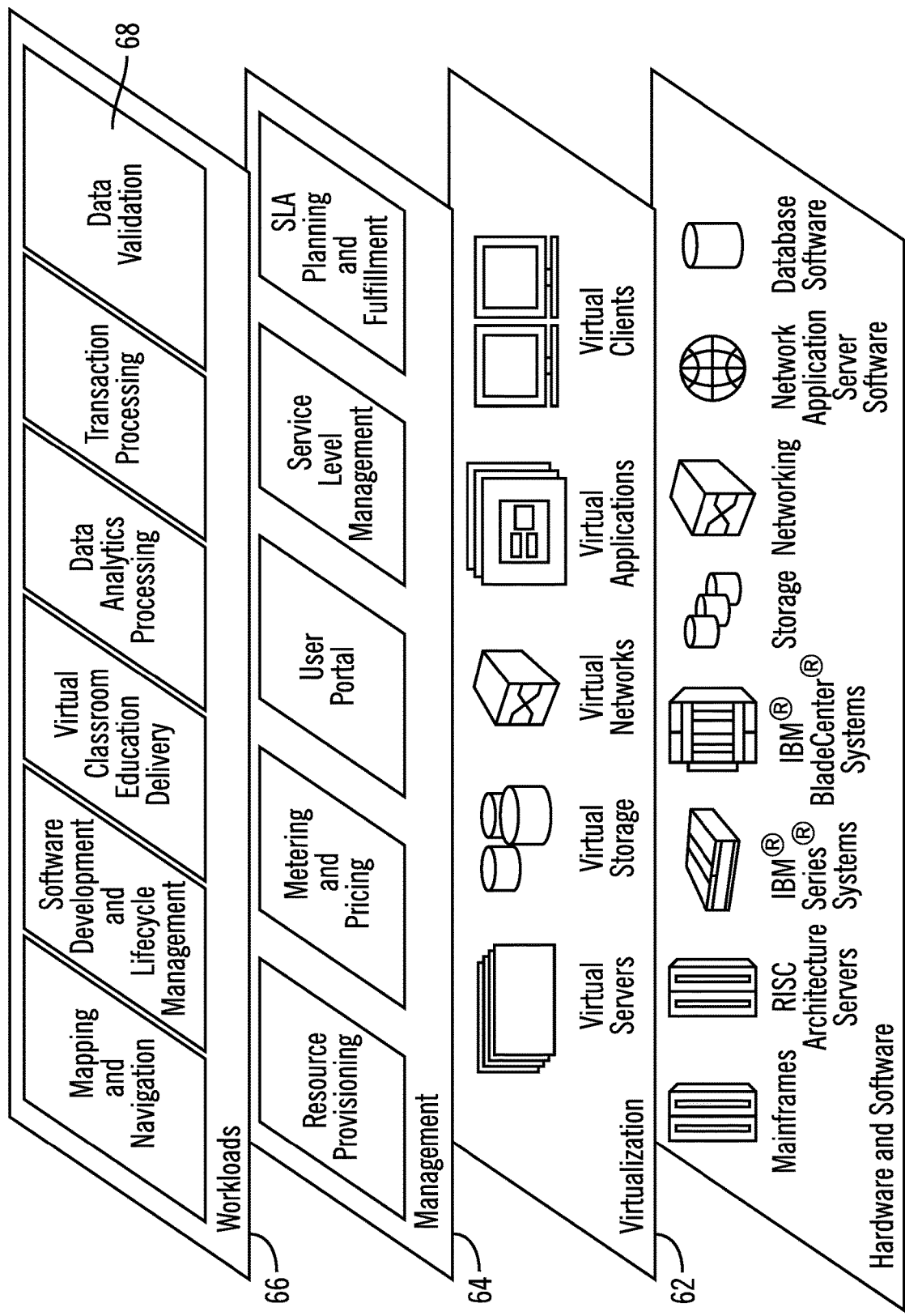
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components.

Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data validation operations 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
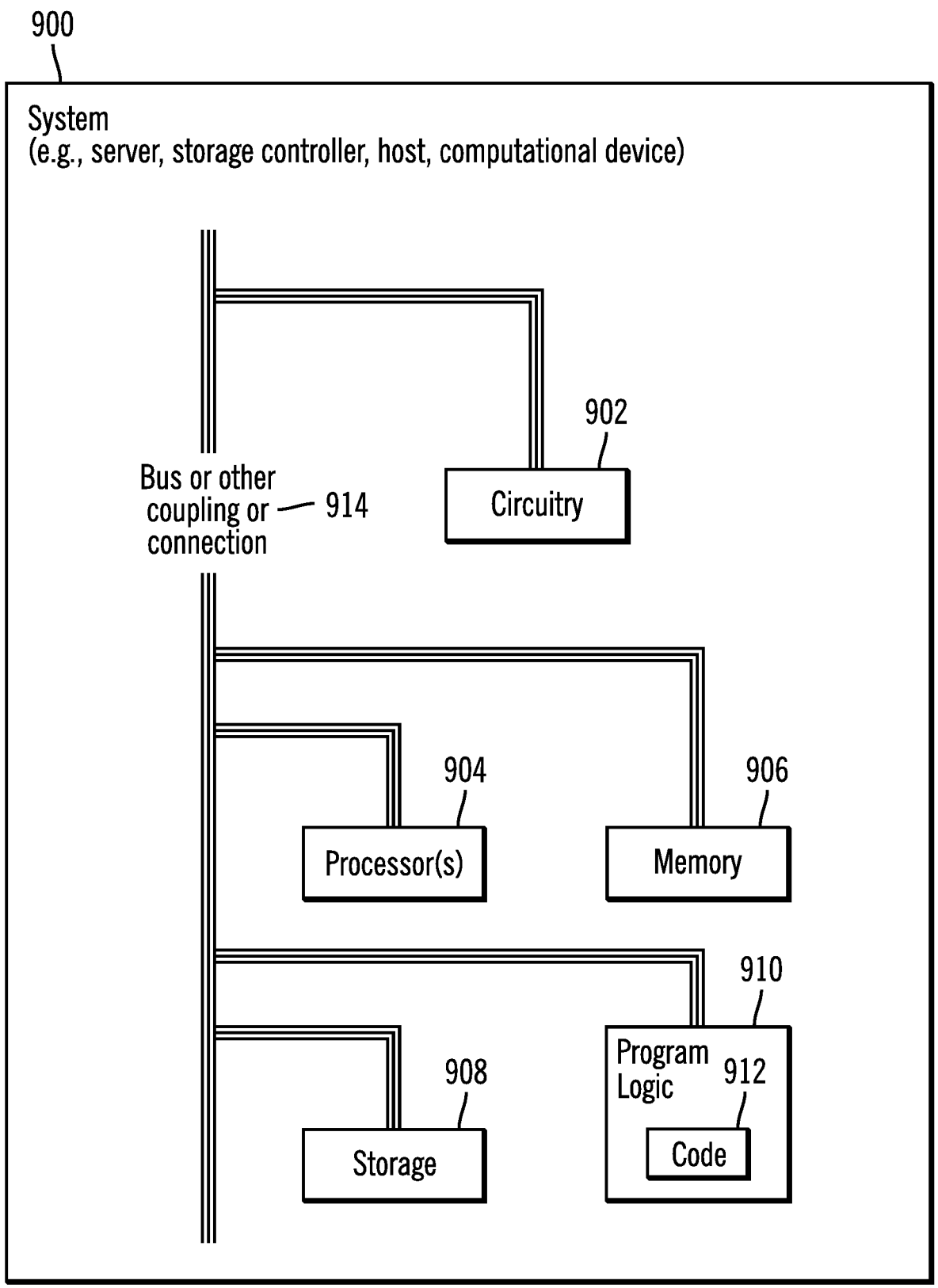
FIG. 10 illustrates a block diagram of a computational system that shows certain elements that may be included in the storage controller or the host, as described in FIGS. 1-9, in accordance with certain embodiments.

FIG. 10 illustrates a block diagram that shows certain elements that may be included in the storage controller 102, the servers 110, 112, the hosts 104, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
configuring a first server of a storage controller to communicate with a host via a first bus interface, and configuring a second server of the storage controller to communicate with the host via a second bus interface;
writing data via a syncio process from the host via the first bus interface to a cache of the first server and via the second bus interface to a non-volatile storage of the second server; and
periodically comparing the data stored in the cache of the first server to the data stored in the non-volatile storage of the second server, wherein the syncio process allows the host to hold an application thread in a spin loop waiting for a write operation to complete; and
in response to the data stored in the cache of the first server matching the data stored in the non-volatile storage of the second server during the comparing, continuing to operate both the first server and the second server.

2. The method of claim 1, the method further comprising:
in response to the data stored in the cache of the first server not matching the data stored in the non-volatile storage of the second server during the comparing, disabling operation of the second server, and continuing to service commands from the host via the first server.

3. The method of claim 2, wherein the comparing of the data is performed after a predetermined plurality of destages from the cache of the first server or after passage of a predetermined amount of time.

4. A method, comprising:
configuring a first server of a storage controller to communicate with a host via a first bus interface, and configuring a second server of the storage controller to communicate with the host via a second bus interface;

writing data via a syncio process from the host via the first bus interface to a cache of the first server and via the second bus interface to a non-volatile storage of the second server; and periodically comparing the data stored in the cache of the first server to the data stored in the non-volatile storage of the second server, wherein the syncio process allows the host to hold an application thread in a spin loop waiting for a write operation to complete, wherein a likelihood of an error in writing identical data to the cache of the first server and the non-volatile storage of the second server is greater when the identical data is attempted to be written from the host to the first server and the second server over the first bus interface and the second bus interface, than over a network interface.

5. The method of claim 4, the method further comprising:
in response to determining that either data in records of a first buffer does not match with data in records of a second buffer, or record headers except for adapter identifiers of the records of the first buffer do not match with record headers except for adapter identifiers of the records of the second buffer, determining that the data stored in the cache of the first server does not match the data stored in the non-volatile storage of the second server.

6. A system communicatively coupled to a host, the system comprising:
a memory; and
a processor coupled to the memory, wherein the processor performs operations, the operations performed by the processor comprising:
configuring a first server to communicate with the host via a first bus interface, and configuring a second server to communicate with the host via a second bus interface;
writing data via a syncio process from the host via the first bus interface to a cache of the first server and via the second bus interface to a non-volatile storage of the second server;
periodically comparing the data stored in the cache of the first server to the data stored in the non-volatile storage of the second server, wherein the syncio process allows the host to hold an application thread in a spin loop waiting for a write operation to complete; and
in response to the data stored in the cache of the first server matching the data stored in the non-volatile storage of the second server during the comparing, continuing to operate both the first server and the second server.

7. The system of claim 6, the operations further comprising:
in response to the data stored in the cache of the first server not matching the data stored in the non-volatile storage of the second server during the comparing, disabling operation of the second server, and continuing to service commands from the host via the first server.

8. The system of claim 7, wherein the comparing of the data is performed after a predetermined plurality of destages from the cache of the first server or after passage of a predetermined amount of time.

9. A system communicatively coupled to a host, the system comprising:
a memory; and
a processor coupled to the memory, wherein the processor performs operations, the operations performed by the processor comprising:
configuring a first server to communicate with the host via a first bus interface, and configuring a second server to communicate with the host via a second bus interface;
writing data via a syncio process from the host via the first bus interface to a cache of the first server and via the second bus interface to a non-volatile storage of the second server; and
periodically comparing the data stored in the cache of the first server to the data stored in the non-volatile storage of the second server, wherein the syncio process allows the host to hold an application thread in a spin loop waiting for a write operation to complete, wherein a likelihood of an error in writing identical data to the cache of the first server and the non-volatile storage of the second server is greater when the identical data is attempted to be written from the host to the first server and the second server over the first bus interface and the second bus interface, than over a network interface.

10. The system of claim 9, the operations further comprising:
in response to determining that either data in records of a first buffer does not match with data in records of a second buffer, or record headers except for adapter identifiers of the records of the first buffer do not match with record headers except for adapter identifiers of the records of the second buffer, determining that the data stored in the cache of the first server does not match the data stored in the non-volatile storage of the second server.

11. A computer program product, the computer program product comprising a computer readable storage medium having computer readable program code embodied therewith, the computer readable program code configured to perform operations, the operations comprising:
configuring a first server of a storage controller to communicate with a host via a first bus interface, and configuring a second server of the storage controller to communicate with the host via a second bus interface;
writing data via a syncio process from the host via the first bus interface to a cache of the first server and via the second bus interface to a non-volatile storage of the second server;
periodically comparing the data stored in the cache of the first server to the data stored in the non-volatile storage of the second server, wherein the syncio process allows the host to hold an application thread in a spin loop waiting for a write operation to complete; and
in response to the data stored in the cache of the first server matching the data stored in the non-volatile storage of the second server during the comparing, continuing to operate both the first server and the second server.

12. The computer program product of claim 11, the operations further comprising:
in response to the data stored in the cache of the first server not matching the data stored in the non-volatile storage of the second server during the comparing, disabling operation of the second server, and continuing to service commands from the host via the first server.

13. The computer program product of claim 12, wherein the comparing of the data is performed after a predetermined plurality of destages from the cache of the first server or after passage of a predetermined amount of time.

14. A computer program product, the computer program product comprising a computer readable storage medium having computer readable program code embodied therewith, the computer readable program code configured to perform operations, the operations comprising:

configuring a first server of a storage controller to communicate with a host via a first bus interface, and configuring a second server of the storage controller to communicate with the host via a second bus interface;

writing data via a syncio process from the host via the first bus interface to a cache of the first server and via the second bus interface to a non-volatile storage of the second server; and periodically comparing the data stored in the cache of the first server to the data stored in the non-volatile storage of the second server, wherein the syncio process allows the host to hold an application thread in a spin loop waiting for a write operation to complete, wherein a likelihood of an error in writing identical data to the cache of the first server and the non-volatile storage of the second server is greater when the identical data is attempted to be written from the host to the first server and the second server over the first bus interface and the second bus interface, than over a network interface.

15. The computer program product of claim 14, the operations further comprising:

in response to determining that either data in records of a first buffer does not match with data in records of a second buffer, or record headers except for adapter identifiers of the records of the first buffer do not match with record headers except for adapter identifiers of the records of the second buffer, determining that the data stored in the cache of the first server does not match the data stored in the non-volatile storage of the second server.

* * * * *